United States Patent

Ohira et al.

[11] Patent Number: 5,903,132
[45] Date of Patent: May 11, 1999

[54] BATTERY PACK HOLDING STRUCTURE PROVIDING FORCE COMPONENTS FOR ELIMINATING PLAY OF AN ELECTRONIC DEVICE IN PLURAL DIMENSIONS

[75] Inventors: Akinori Ohira; Tetsuya Kubo; Noriyoshi Sato; Kazutoshi Ichinose, all of Yokohama, Japan

[73] Assignee: Matsushita Electric Industrial Co., Ltd., Osaka, Japan

[21] Appl. No.: 08/947,346

[22] Filed: Oct. 8, 1997

[30] Foreign Application Priority Data

Oct. 9, 1996 [JP] Japan .................................. 8-268587

[51] Int. Cl.[6] .................................................. H01M 10/46
[52] U.S. Cl. .......................................... 320/107; 320/112
[58] Field of Search ..................................... 320/107, 110, 320/111, 112, 114; 429/96, 97, 98, 99, 100; 361/730, 731, 732

[56] References Cited

U.S. PATENT DOCUMENTS

5,615,250  3/1997  Kobayashi .................................. 379/61
5,621,618  4/1997  Komiyama .................................. 361/732
5,649,750  7/1997  Ishii et al. ............................. 429/97 X
5,716,730  2/1998  Deguchi .................................. 429/97

*Primary Examiner*—Edward H. Tso
*Attorney, Agent, or Firm*—Lowe Hauptman Gopstein Gilman & Berner

[57] ABSTRACT

A battery holding apparatus holds a battery pack on a battery mount of an electronic device such as a portable telephone. The battery holding apparatus includes a holding member and a hook assembly. The holding member is provided on a first end of the battery mount and has formed thereon a claw fitted into a first recess formed on a first end of the battery pack. The hook assembly is provided on a second end portion of the battery mount opposite to the first end thereof and includes a spring and a protrusion. The protrusion is urged by the spring pressure produced by the spring into constant engagement with a second recess formed in a second end of the battery pack opposite to the first end thereof so as to split the spring pressure into a horizontal pressure and a vertical pressure. The horizontal pressure urges the second end of the battery pack against the holding member to eliminate any horizontal play of the battery pack on the battery mount. The vertical pressure urges the second end of the battery pack against the battery mount to eliminate any vertical play of the battery pack on the battery mount.

9 Claims, 10 Drawing Sheets

BATTERY PACK HOLDING STRUCTURE PROVIDING FORCE COMPONENTS FOR ELIMINATING PLAY OF AN ELECTRONIC DEVICE IN PLURAL DIMENSIONS

BACKGROUND OF THE INVENTION

1. Technical Field of the Invention

The present invention relates generally to an improved structure of a holder designed to hold a battery pack on an electronic device such as a portable telephone without any play.

2. Background of Related Art

Figure 9A:
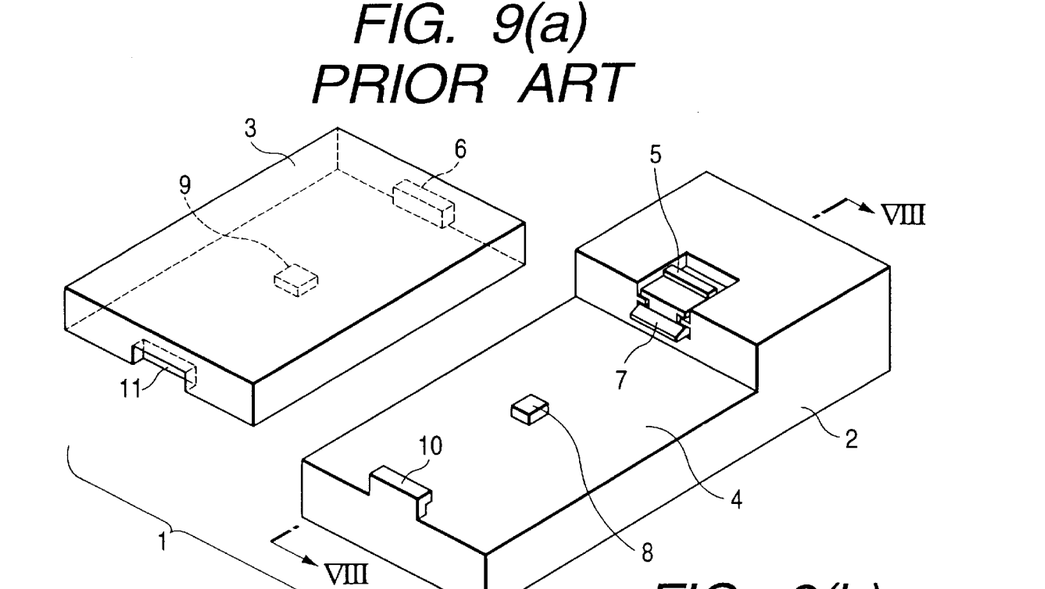
FIG. 9(a) is a perspective view which shows a conventional battery holder structure for a portable telephone.
Figures 9B, 9C:
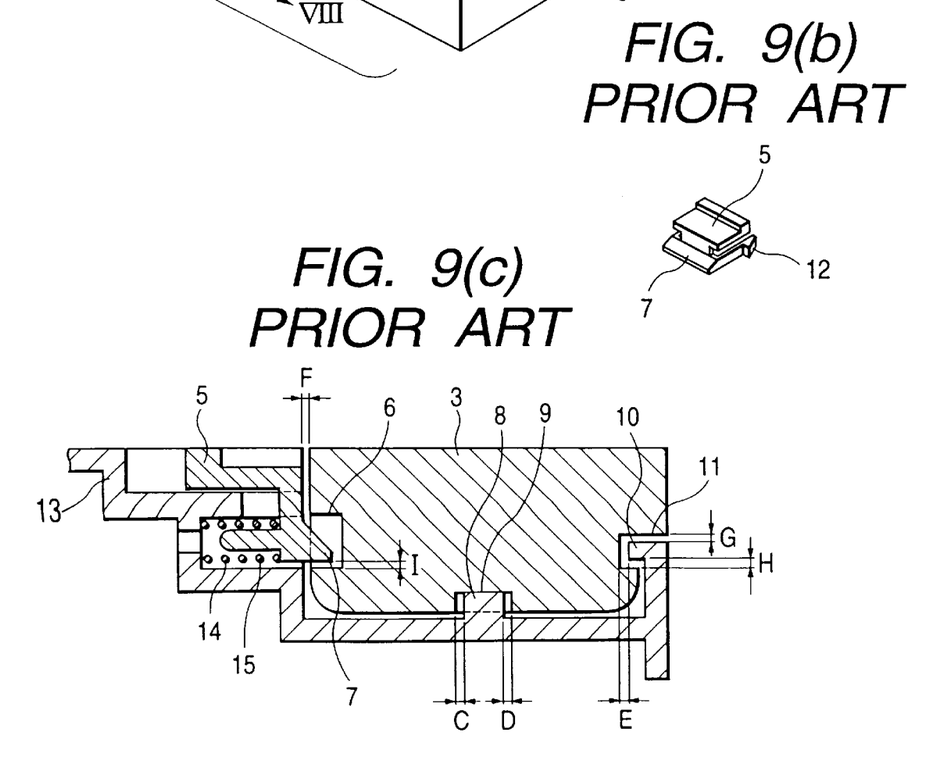
FIG. 9(b) is a perspective view which shows a slidable holder of the battery holder structure shown in FIG. 9(a)
FIG. 9(c) is a cross sectional view taken along the line VIII which shows installation of a battery pack on a battery mount formed on a telephone body shown in FIG. 9(a)

FIGS. 9(a) to 9(c) show a conventional battery holder structure for portable telephones.

The portable telephone 1 includes a telephone body 2 and a battery pack 3 installed on a battery mount 4 of the telephone body 2. The telephone body 2 includes a casing 13 which has formed therein a chamber 15 within which a slidable hook 5 is disposed. The slidable hook 5 has, as shown in FIG. 9(b), formed thereon a tapered or wedge-shaped protrusion 7 and is spring-loaded by a coil spring 14. The battery mount 4 of the telephone body 2 has formed thereon a positioning protrusion 8 and a fixing claw 10. The battery pack 3 has fixing recesses 6 and 11 formed in ends thereof and a positioning recess 9 formed in the bottom thereof. The installation of the battery pack 1 on the telephone body 2 is accomplished by engaging the fixing claw 10 with the fixing recess 11, fitting the positioning protrusion 8 into the positioning recess 9, and engaging the slidable hook 5 with the fixing recess 6.

Any play of the battery pack 3 in a longitudinal direction is eliminated by minimizing clearances C (or D), E, and F between the positioning recess 9 and the positioning protrusion 8, between the fixing recess 11 and the fixing claw 10, and between the telephone body 2 and the battery pack 3. Any play of the battery pack in a horizontal direction is eliminated by minimizing a clearance G (or H) between the fixing claw 10 and the fixing recess 11.

Figure 10A:
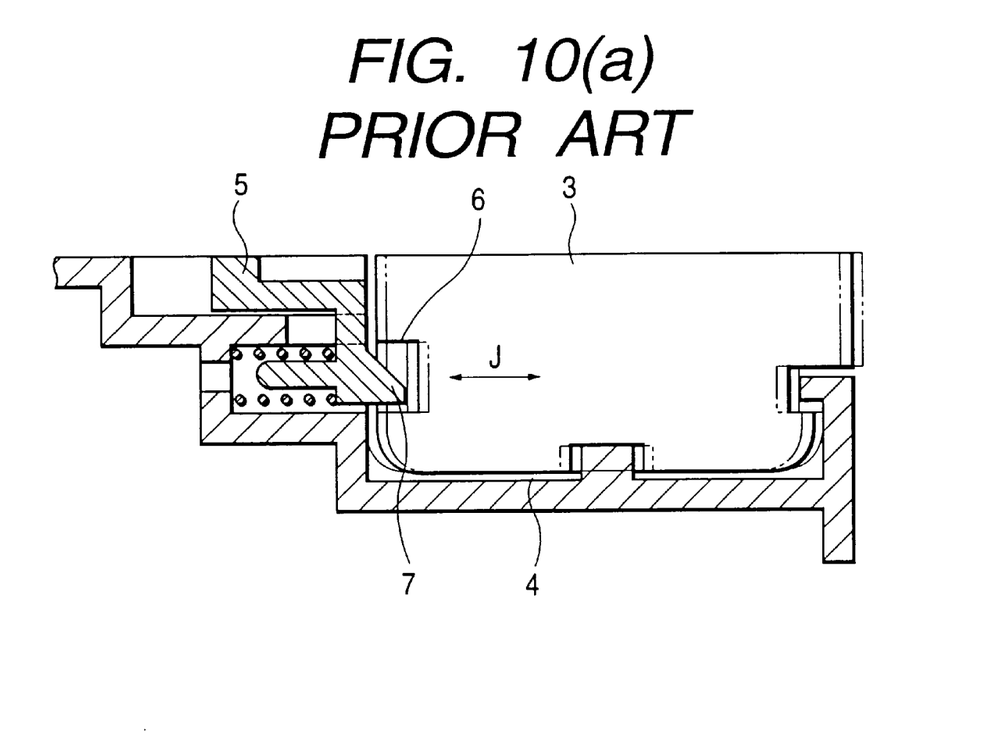
FIG. 10(a) is a cross sectional view which shows horizontal play J of a battery pack when mounted on a telephone body shown in FIG. 9(a)

In the battery holder structure as described above, stabilization in mounting the battery pack 3 on the telephone body 2 requires a high degree of management of dimensional accuracy of the clearances between the battery pack 3 and the telephone body 2. If the battery holder structure is made of a resin mold which may show a great variation in finished size, it is difficult to manage the clearances between the battery pack 3 and the telephone body 2. For example, it is difficult to eliminate longitudinal play J, as shown in FIG. 10(a), caused by the clearances between the battery pack 3 and the telephone body 2.

Figure 10B:
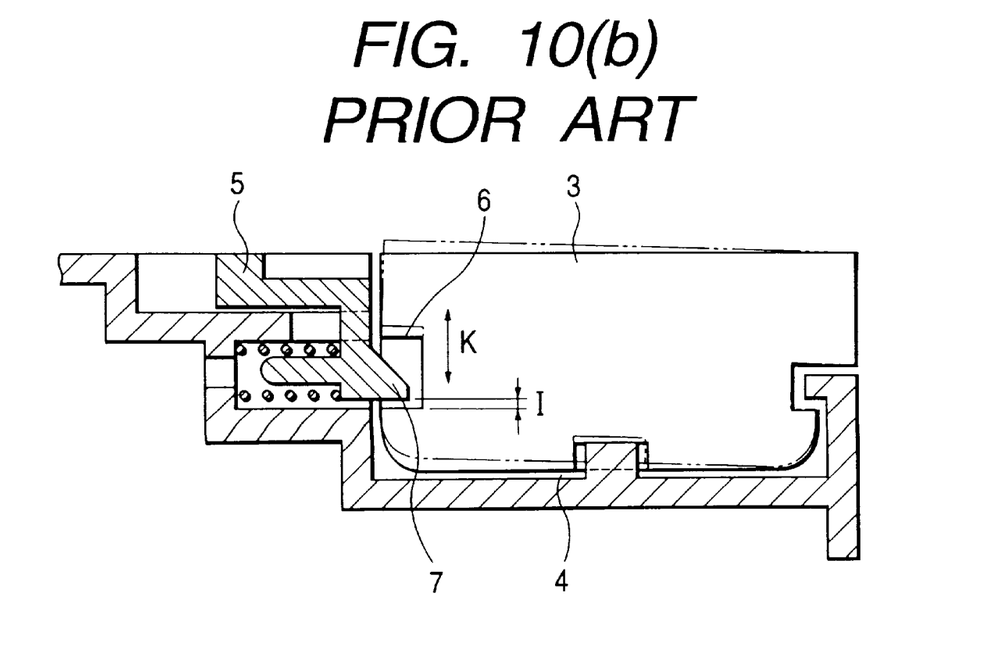
FIG. 10(b) is a cross sectional view which shows vertical play K of a battery pack when mounted on a telephone body shown in FIG. 9(a).

Additionally, a clearance I is provided between a bottom wall of the wedge-shaped protrusion 7 of the slidable hook 5 and a bottom wall of the fixing recess 6 for facilitating ease of insertion of the wedge-shaped protrusion 7 into the fixing recess 6. This results in play K of the battery pack 3 in a widthwise direction thereof.

SUMMARY OF THE INVENTION

It is therefore a principal object of the present invention to avoid the disadvantages of the prior art.

It is another object of the present invention to provide an improved structure of a holder which is designed to hold a battery pack on an electronic device such as a portable telephone without any play.

According to one aspect of the present invention, there is provided a holding apparatus for holding a battery pack on a battery mount which comprises: (a) a holding member provided on a first end portion of the battery mount for holding a first end portion of the battery pack on the battery mount; and (b) a hook assembly provided on a second end portion of the battery mount opposite to the first end portion for holding a second end portion of the battery pack opposite to the first end portion on the battery mount, the hook assembly including a spring and a protrusion which is urged by a spring pressure produced by the spring into constant engagement with a recess formed in the second end portion of the battery pack so as to split the spring pressure into a horizontal pressure and a vertical pressure, the horizontal pressure urging the second end portion of the battery pack against the holding member to eliminate any horizontal play of the battery pack on the battery mount, the vertical pressure urging the second end portion of the battery pack against the battery mount to eliminate any vertical play of the battery pack on the battery mount.

In the preferred mode of the invention, the hook assembly is spring-loaded by the spring within a chamber formed in the battery mount so that the protrusion of the hook assembly slides into the chamber when the battery pack is fitted on the battery mount for facilitating ease of mounting of the battery pack on the battery mount.

The protrusion of the hook assembly has a surface inclined at a given angle relative to a direction in which the spring pressure urges the hook assembly into constant engagement of the protrusion with the recess formed in the second end portion of the battery pack so as to split the spring pressure into the horizontal pressure and the vertical pressure.

The inclined surface of the protrusion engages a corner defining the recess of the battery pack to distribute the spring pressure in a horizontal direction and a vertical direction to produce the horizontal pressure and the vertical pressure.

The hook assembly also has a pair of side protrusions across the protrusion which are inserted into a pair of side recessed portions formed across the recess formed in the second end portion of the battery pack for avoiding dislodgment of the battery pack from the battery mount.

The hook assembly may alternatively include a second protrusion which is inserted into a second recessed portion formed in the second end portion of the battery pack for avoiding dislodgment of the battery pack from the battery mount.

The hook assembly may also include a third protrusion which is urged by the spring pressure into constant engagement with a third recess formed in the second end portion of the battery pack. The third protrusion has a surface inclined at the given angle relative to the direction in which the spring pressure urges the hook assembly into constant engagement of the third protrusion with the third recess as to split the spring pressure into a horizontal pressure and a vertical pressure. The horizontal pressure urges the second end portion of the battery pack against the holding member to eliminate the horizontal play of the battery pack on the battery mount. The vertical pressure urges the second end portion of the battery pack against the battery mount to eliminate the vertical play of the battery pack on the battery mount.

The third protrusion is provided opposite the protrusion across the second protrusion. The inclined surface of the third protrusion engages a corner defining the third recess of the battery pack to distribute the spring pressure in a horizontal direction and a vertical direction to produce the horizontal pressure and the vertical pressure.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1A:
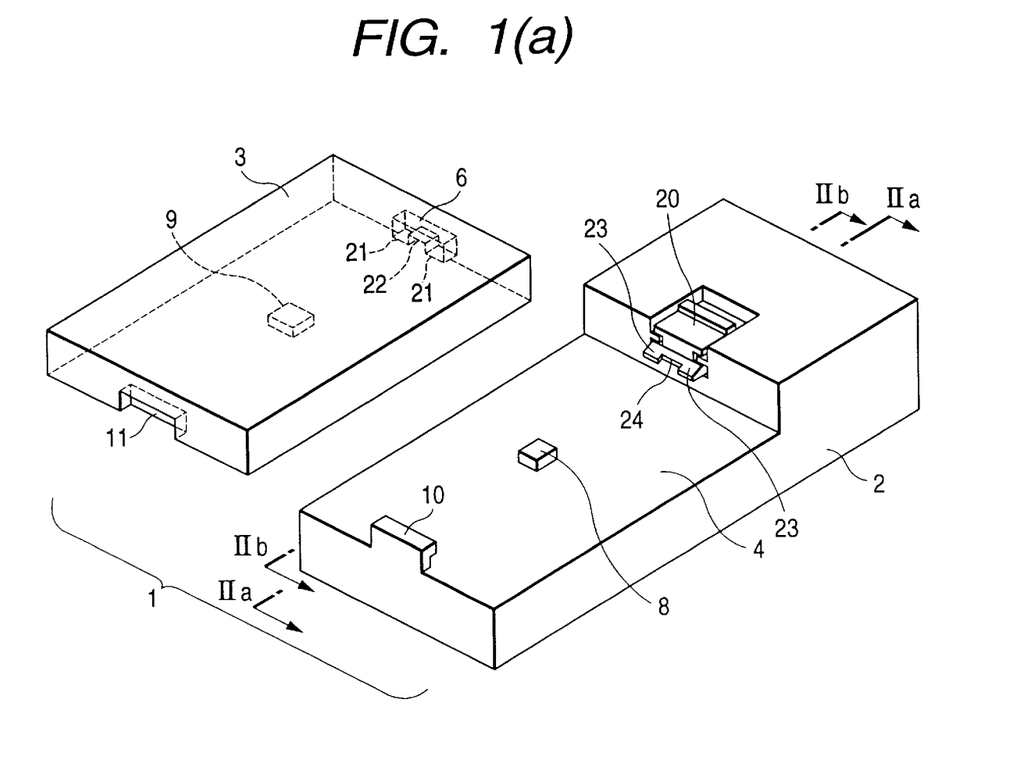
FIG. 1(a) is a perspective view which shows a battery holder structure for a portable telephone according to the first embodiment of the invention.

Referring now to the drawings, particularly to FIG. 1(a), there is shown a battery holder structure for portable telephones.

The portable telephone 1 consists of a telephone body 2 and a battery pack 3 installed on a battery mount 4 formed on a back surface of the telephone body 2. The battery mount 4 has a battery pack positioning protrusion 8 formed on a central portion thereof and a fixing claw 10 extending vertically from an end portion thereof. A slidable hook 20 is disposed in alignment with the positioning protrusion 8 and the fixing claw 10 within a hook chamber 15, as shown in FIG. 2(a), formed in a stepped portion of a casing 13 of the telephone body 2. The slidable hook 20 includes, as clearly shown in FIG. 1(b), a wedge-shaped protrusion consisting of a pair of side tapered portions 23 and a central tapered portion 24 caved between the side tapered portions 23 and is urged by a coil spring 14 so that the wedge-shaped protrusion projects to the battery mount 4 at all times.

Figure 2A:
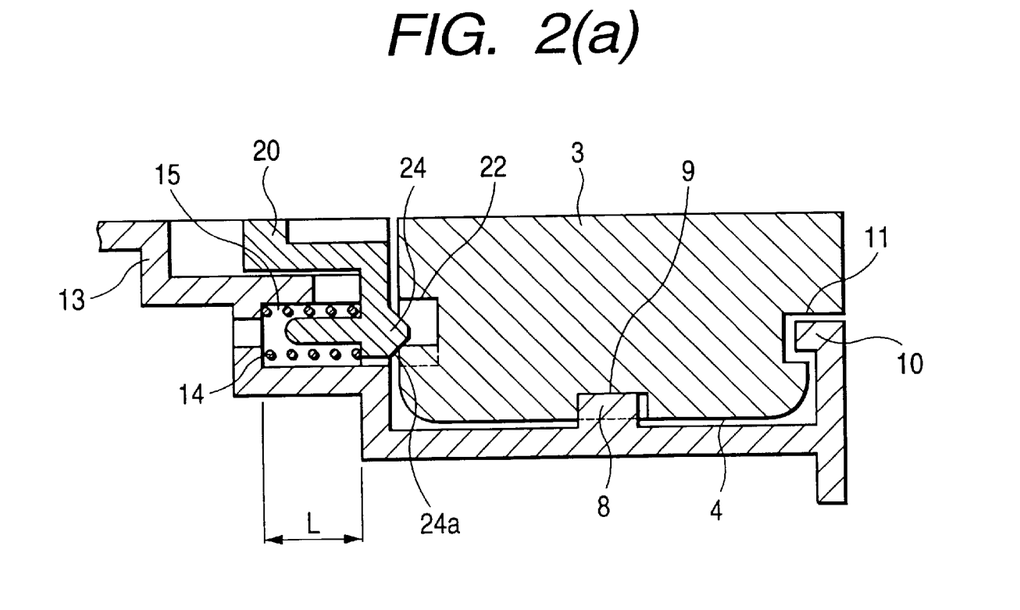
FIG. 2(a) is a cross sectional view taken along the line IIa in FIG. 1(a)
Figure 2B:
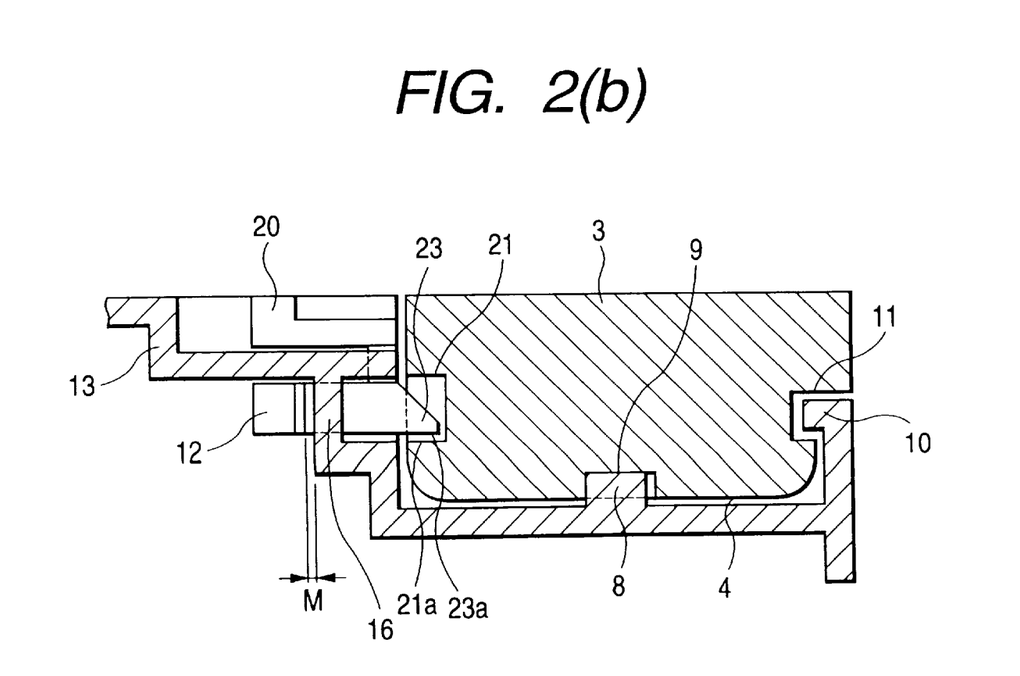
FIG. 2(b) is a cross sectional view taken along the line IIb in FIG. 1(a)

The battery pack 3 has fixing recesses 6 and 11 formed in both ends thereof and a battery pack positioning recess 9 formed in a central portion of the bottom thereof. The fixing recess 6 is defined by a pair of side recessed portions 21 for receiving, as shown in FIG. 2(b), the pair of side tapered portions 23 of the slidable hook 20 and a central recessed portion 22 for receiving, as shown in FIG. 2(a), the central tapered portion 24 of the slidable hook 20.

Figure 1B:
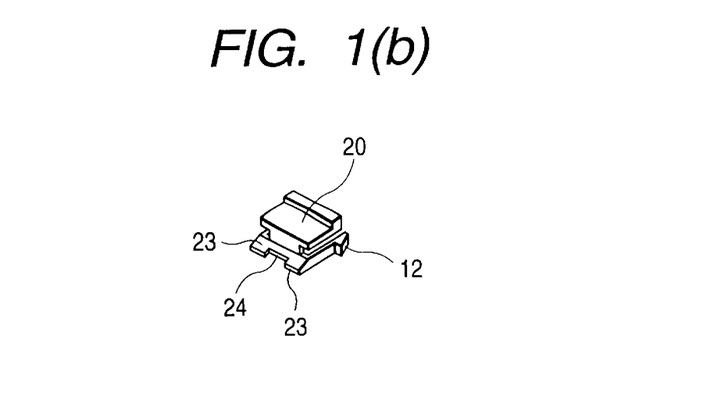
FIG. 1(b) is a perspective view which shows a slidable holder for holding a battery pack on a telephone body.

The slidable hook 20 also includes, as shown in FIG. 1(b), a pair of barb-like protrusions 12 extending from the side tapered portions 23 backward. The barb-like protrusions 12 serve as stoppers which engage, as shown in FIG. 2(b), ribs 16 formed in the hook chamber 15 for holding the slidable hook 20 from being dislodged from the hook chamber 15 by the spring pressure of the spring 14.

The spring 15 is compressed within the hook chamber 15 to have the length L, as shown in FIG. 2(a), which produces a preselected spring pressure acting on the slidable hook 20. The barb-like protrusions 12 of the slidable hook 20 are, as clearly shown in FIG. 2(b), spaced at the interval M away from the ribs 16 when the battery pack 3 is installed on the battery mount 4 so that the spring pressure of the spring 14 urges the tapered portions 23 and 24 of the slidable hook 20 in the right direction, as viewed in the drawing, into constant engagement with the fixing recess 6 of the battery pack 3.

Figure 3A:
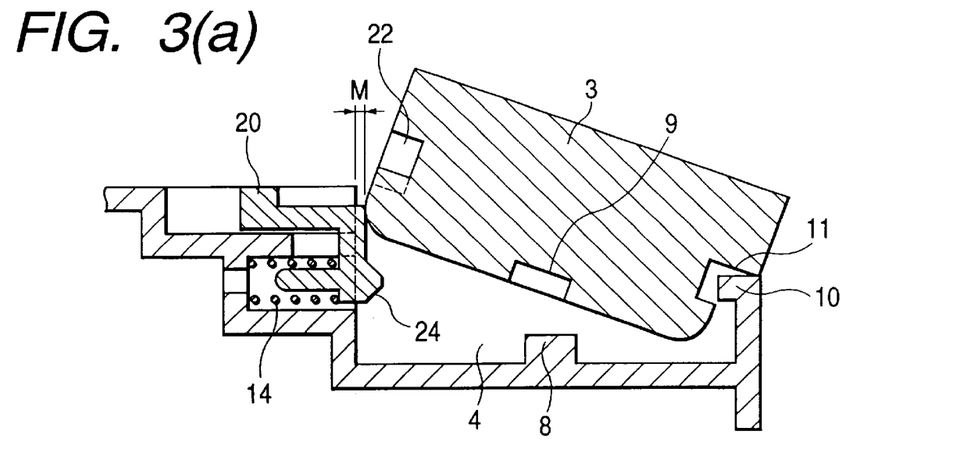
FIGS. 3(a) to 3(c) are cross sectional views which show a sequence of mounting operations in mounting a battery pack on a telephone body.
Figure 3B:
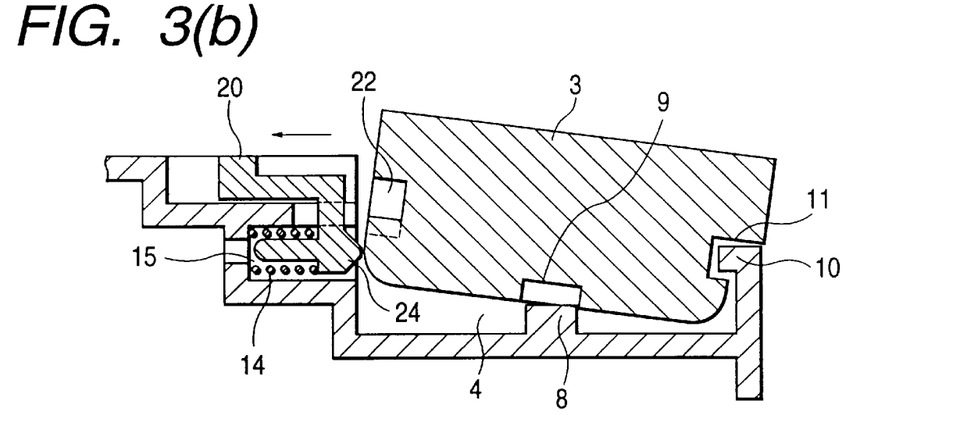
Figure 3C:
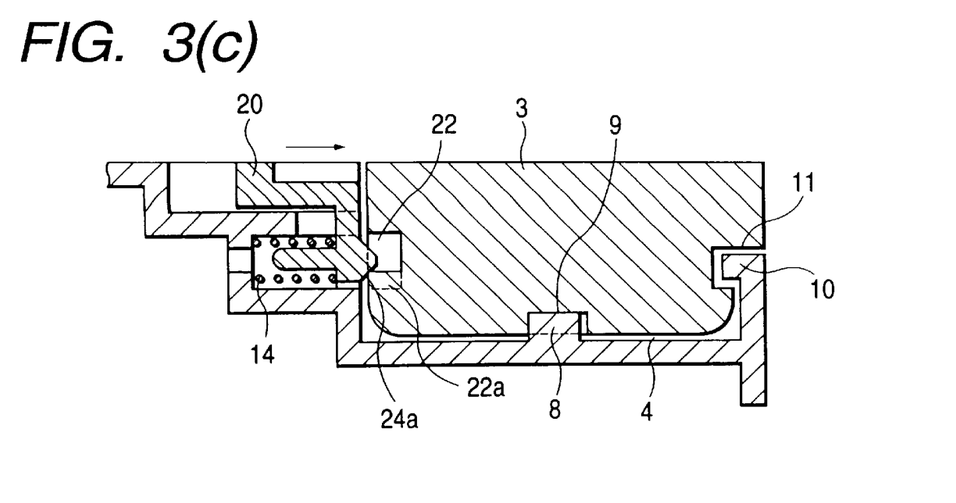
Figure 4A:
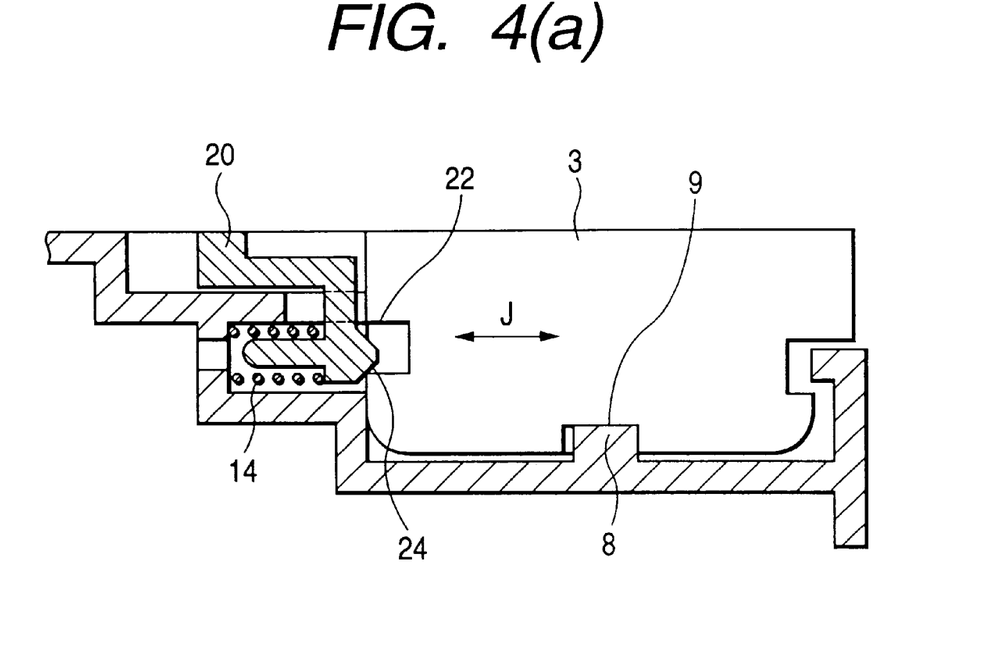
FIG. 4(a) is a cross sectional view which shows horizontal play of a battery pack on a battery mount of a telephone body.
Figure 4B:
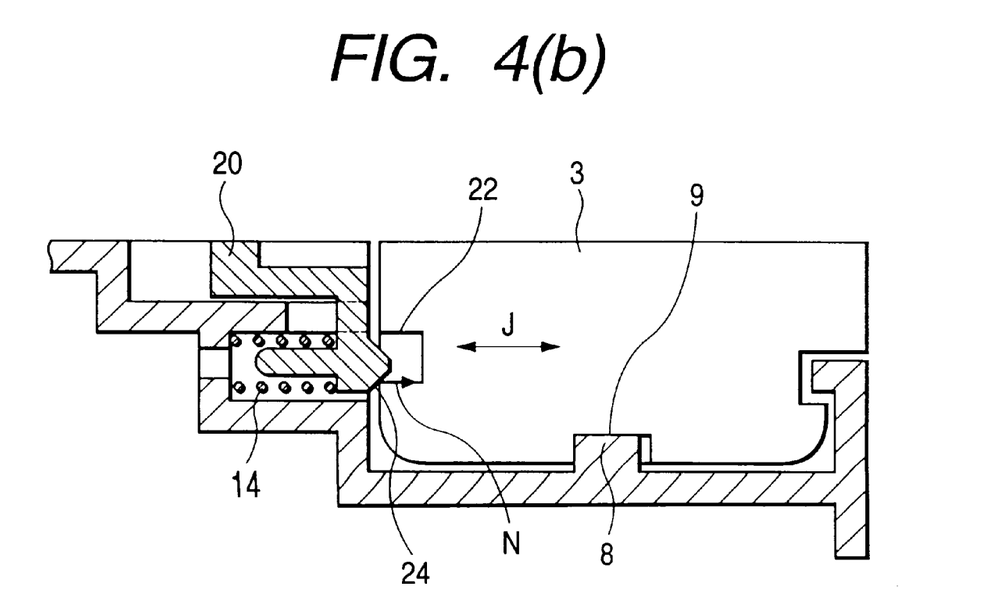
FIG. 4(b) is a cross sectional view which shows spring pressure N acting on a battery pack to eliminate the horizontal play shown in FIG. 4(a)
Figure 5A:
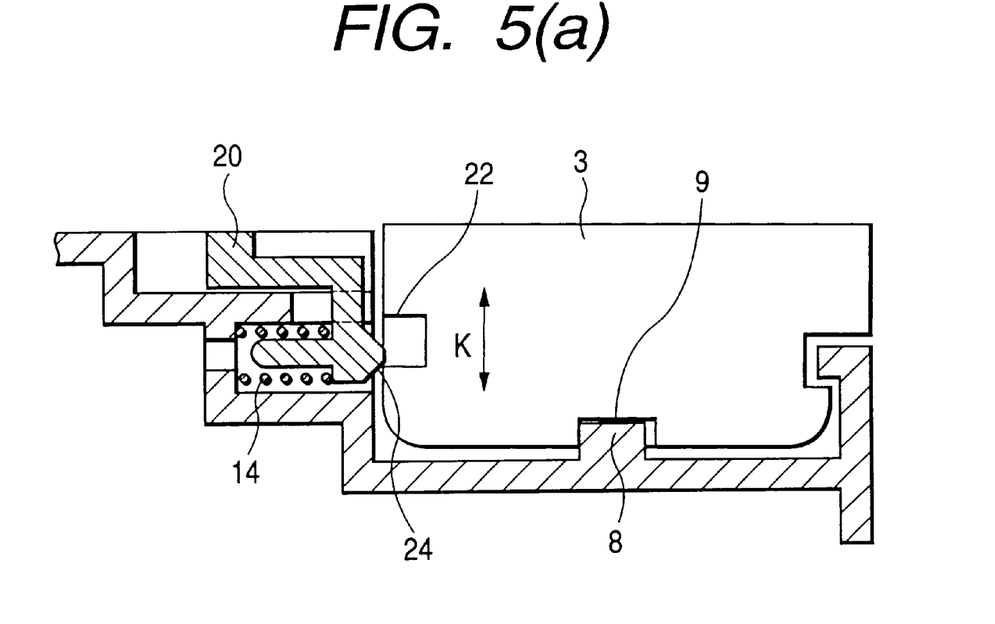
FIG. 5(a) is a cross sectional view which shows vertical play of a battery pack on a battery mount of a telephone body.
Figure 5B:
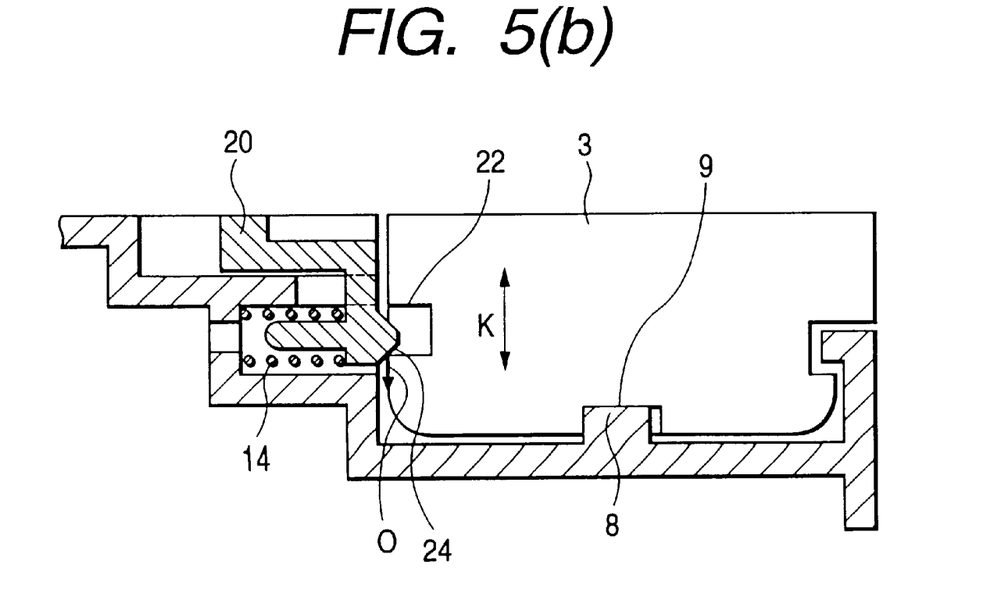
FIG. 5(b) is a cross sectional view which shows-spring pressure O acting on a battery pack to eliminate the horizontal play shown in FIG. 4(a)

The installation of the battery pack 3 on the battery mount 4 of the telephone body 2 is achieved by fitting the fixing recess 11, as shown in FIG. 3(a), to the fixing claw 10 and pressing, as shown in FIG. 3(b), the end of the battery pack 3 in which the fixing recess 6 is formed toward an upper surface of the battery mount 4, thereby forcing the slidable hook 20 into the hook chamber 15. Upon reaching of the bottom of the battery pack 3 to the upper surface of the battery mount 4, the slidable hook 20 is, as shown in FIG. 3(c), moved outward by the spring pressure of the spring 14 to bring the central tapered portion 24 into constant engagement with the central recessed portion 22. Specifically, a lower surface 24a of the central tapered portion 24 of the slidable hook 20, as clearly shown in FIG. 3(c), which is inclined upward about 45° to a sliding path of the slidable hook 20, is brought into engagement with a protrusion 22a of the battery pack 3 defining the central recessed portion 22 to split the spring pressure produced by the spring 14 into a horizontal pressure N, as shown in FIG. 4(b), and a downward pressure O, as shown in FIG. 5(b). The horizontal pressure N urges the battery pack 3 in a lengthwise direction thereof to eliminate the gap, as shown in FIG. 4(a), between a side surface of the positioning protrusion 8 on the battery mount 4 and a side surface of the positioning recess 9 of the battery pack 3, thereby eliminating horizontal play J of the battery pack 3. The downward pressure O urges the battery pack 3 in a thicknesswise direction thereof to eliminate the gap, as shown in FIG. 5(a), between the upper surface of the positioning protrusion 8 and the bottom surface of the positioning recess 9, thereby eliminating vertical play K of the battery pack 3.

Each of the side tapered portions 23 of the slidable hook 20 is inserted into one of the side recessed portions 21 of the fixing recess 6, thereby holding the battery pack 3 from being dislodged from the battery mount 4, by engagement of a flat surface 23a (i.e., the bottom of each side protrusion 23) with a flat surface 21a (i.e., the bottom of each side recessed portion 21), when the portable telephone 1 is twisted undesirably or when the battery pack 3 is pulled out of the battery mount 4 forcibly.

Figure 6A:
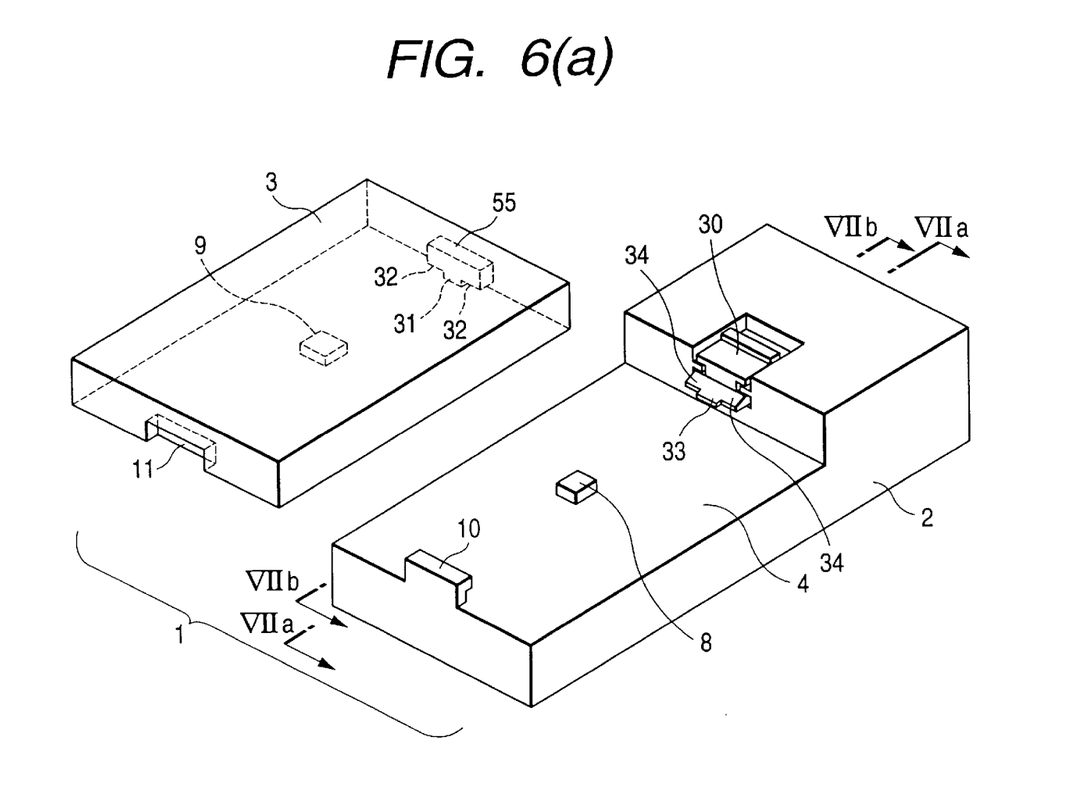
FIG. 6(a) is a perspective view which shows a battery holder structure for a portable telephone according to the second embodiment of the invention.

FIG. 6(a) shows a battery holder structure for portable telephones according to the second embodiment of the invention which is different from the first embodiment in structure of a fixing recess 55 of a battery pack 3 and a slidable hook 30 installed in a telephone body 2. Other arrangements are identical, and explanation thereof in detail will be omitted here.

Figure 6B:
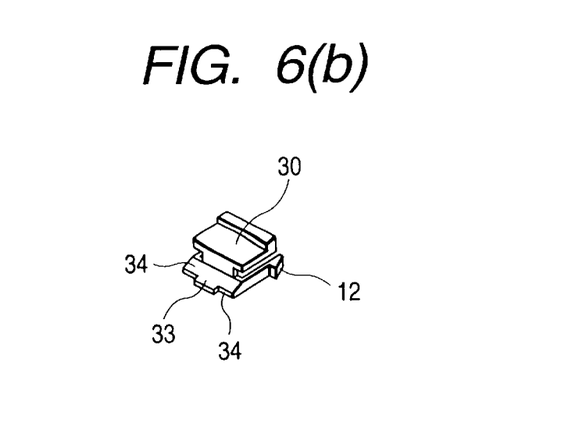
FIG. 6(b) is a perspective view which shows a slidable holder for holding a battery pack on a telephone body.
Figure 7A:
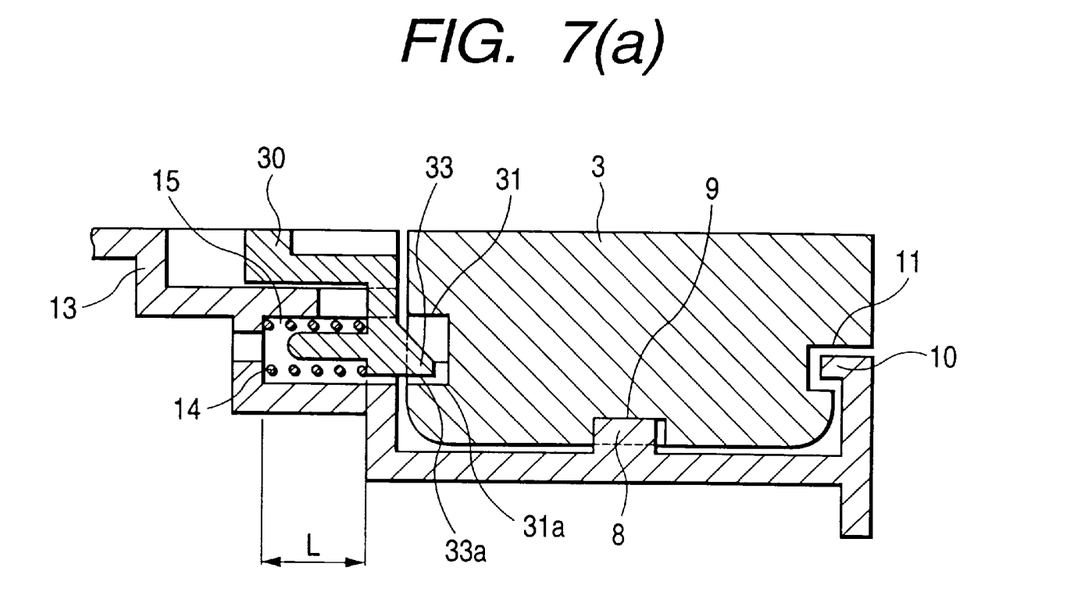
FIG. 7(a) is a cross sectional view taken along the line VIIa in FIG. 6(a) which shows engagement of a central tapered portion of a slidable hook with a central recessed portion of a fixing recess of a battery pack when installed on a telephone body.
Figure 7B:
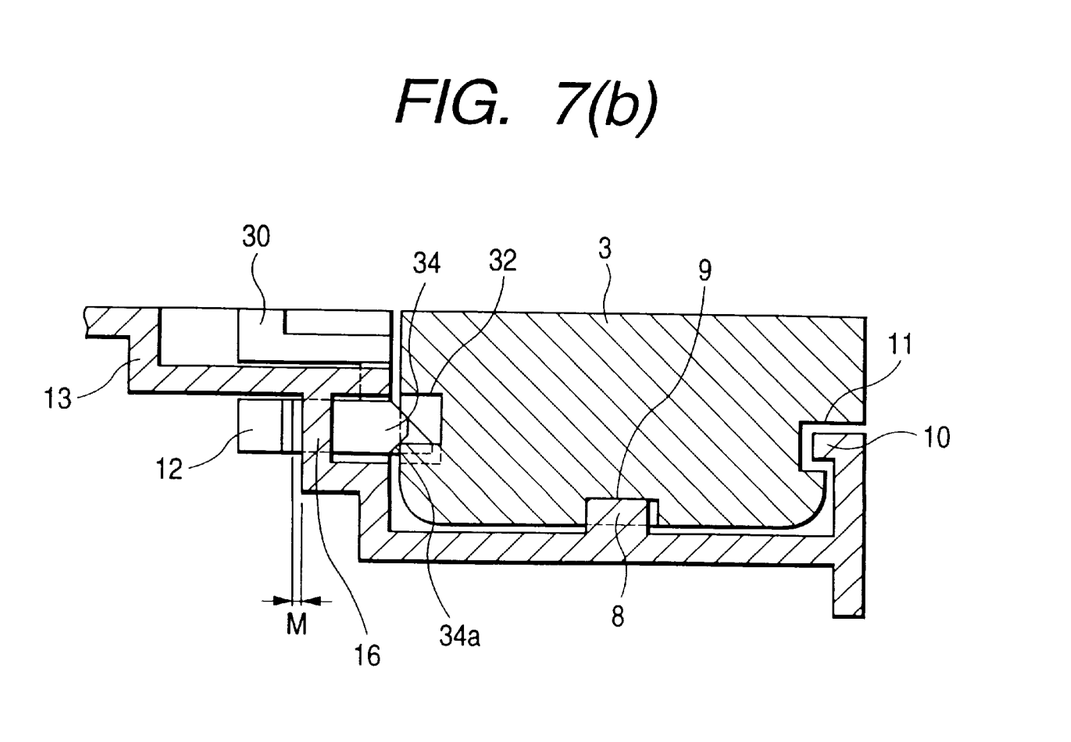
FIG. 7(b) is a cross sectional view taken along the line VIIb in FIG. 6(a) which shows engagement of one of side tapered portions of a slidable hook with corresponding one of side recessed portion of a fixing recess of a battery pack when installed on a telephone body.
Figure 8A:
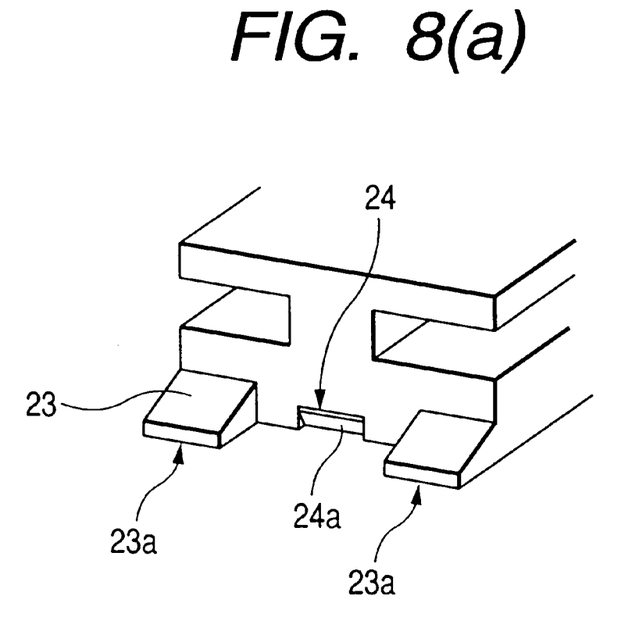
FIG. 8(a) shows a modification of a slidable hook.
Figure 8B:
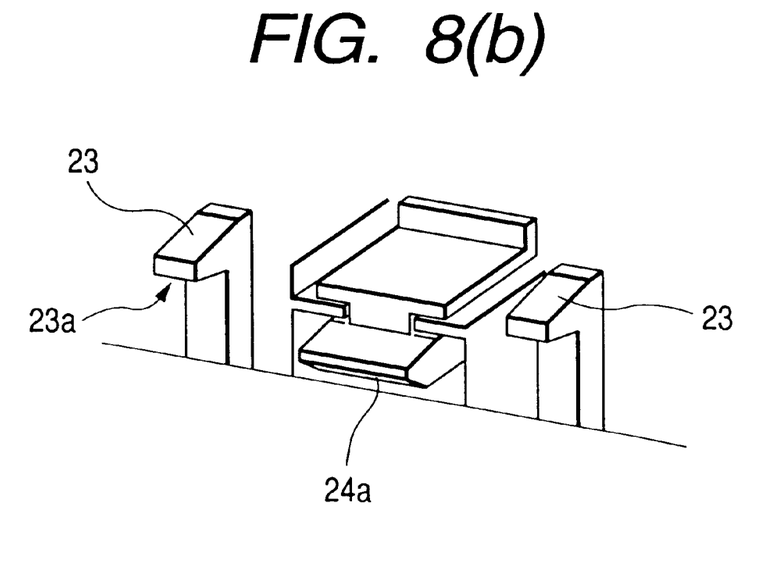
FIG. 8(b) shows a second modification of a slidable hook.

The fixing recess 55 is formed in an end of the battery pack 3 and consists of a pair of side recessed portions 32 and a central recessed portion 31 extending downward from the side recessed portions 32. The slidable hook 30 is, similar to the first embodiment, spring-loaded within the hook chamber 15, as shown in FIG. 7(a), and includes, as clearly shown in FIG. 6(b), a wedge-shaped protrusion consisting of a pair of side tapered portions 34 and a central tapered portion 33 projecting forward and downward from the side tapered portions 34. When the battery pack 3 is mounted on the battery mount 4, the side tapered portions 34 are, as discussed below in detail, brought into contact with bottom walls of the side recessed portions 32 of the battery pack 3, while the central tapered portion 33 is inserted into the central recessed portion 31 of the battery pack 3. The slidable hook 30 also includes a pair of barb-like protrusions 12 extending from the side tapered portions 34 backward. The barb-like protrusions 12 serve as stoppers which engage, as shown in FIG. 7(b), ribs 16 formed in the hook chamber 15 for holding the slidable hook 20 from being dislodged from the hook chamber 15 by the spring pressure of the spring 14.

The installation of the battery pack 3 on the battery mount 4 of the telephone body 2 is achieved in the same manner as that of the first embodiment. Specifically, the fixing recess 11 of the battery pack 3 is first fitted to the fixing claw 10 on the battery mount 4. The end of the battery pack 3 in which the fixing recess 55 is formed is pressed toward an upper surface of the battery mount 4, thereby forcing the slidable hook 30, as shown in FIGS. 7(a) and 7(b), into the hook chamber 15. Upon reaching of the bottom of the battery pack 3 to the upper surface of the battery mount 4, the slidable hook 30 is moved outward by the spring pressure of the spring 14 to bring the side tapered portions 34, as clearly shown in FIG. 7(b), into constant engagement with corners of the bottoms of the side recessed portions 32 of the battery pack 3. Each of the side tapered portions 34 has, as can be seen in FIG. 7(b), a lower tapered surface 34a which engages one of the corners of the bottoms of the side recessed portions 32 when the battery pack 3 is installed on the battery mount 4 to split the spring pressure produced by the spring 14 into a horizontal pressure N and a downward pressure O which are similar to the ones shown in FIGS. 4(b) and 5(b). The horizontal pressure N urges the battery pack 3 in a lengthwise direction thereof to eliminate the gap between a side surface of the positioning protrusion 8 on the battery mount 4 and a side surface of the positioning recess 9 of the battery pack 3, thereby eliminating horizontal play of the battery pack 3. The downward pressure O urges the battery pack 3 in a thicknesswise direction thereof to eliminate the gap between the upper surface of the positioning protrusion 8 and the bottom surface of the positioning recess 9, thereby eliminating vertical play of the battery pack 3.

The central tapered portion 33 of the slidable hook 20 is, as shown in FIG. 7(a), inserted into the central recessed portion 31 of the fixing recess 55, thereby holding the battery pack 3 from being dislodged from the battery mount 4, by engagement of a flat surface 33a (i.e., the bottom of the central tapered portion 33) with a flat surface 31a (i.e., the bottom of the central recessed portion 31), when the portable telephone 1 is twisted undesirably or when the battery pack 3 is pulled out of the battery mount 4 forcibly.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, each of the slidable hooks 20 and 30 may alternatively include one side tapered portion. In this case, each of the fixing recesses 6 and 55 may also include a single side recessed portion into which the side tapered portion is fitted. Further, the flat surfaces 23a of the side protrusions 23 of the slidable hook 20 does not always continue the inclined surface 24a of the central protrusion 24 and may be arranged at a given distance away from each other, as shown in FIGS. 10(a) and 10(b). The same applies to the second embodiment.

What is claimed is:

1. A holding apparatus for holding a battery pack on a battery mount comprising:

a holding member provided on a first end portion of the battery mount for holding a first end portion of the battery pack on the battery mount; and a hook assembly provided on a second end portion of the battery mount opposite to the first end portion for holding a second end portion of the battery pack opposite to the first end portion on the battery mount, said hook assembly including a spring and a protrusion which is urged by a spring pressure produced by the spring into constant engagement with a recess formed in the second end portion of the battery pack so as to split-the spring pressure into a horizontal pressure and a vertical pressure, the horizontal pressure urging the second end portion of the battery pack against said holding member to eliminate any horizontal play of the battery pack on the battery mount, the vertical pressure urging the second end portion of the battery pack against the battery mount to eliminate any vertical play of the battery pack on the battery mount.

2. A holding apparatus as set forth in claim 1, wherein said hook assembly is spring-loaded by the spring within a chamber formed in the battery mount so that the protrusion of said hook assembly slides into the chamber when the battery pack is fitted on the battery mount for facilitating ease of mounting of the battery pack on the battery mount.

3. A holding apparatus as set forth in claim 1, wherein the protrusion of said hook assembly has a surface inclined at a given angle relative to a direction in which the spring pressure urges said hook assembly into constant engagement of the protrusion with the recess formed in the second end portion of the battery pack so as to split the spring pressure into the horizontal pressure and the vertical pressure.

4. A holding apparatus as set forth in claim 3, wherein the inclined surface of said protrusion engages a corner defining the recess of the battery pack to distribute the spring pressure in a horizontal direction and a vertical direction to produce the horizontal pressure and the vertical pressure.

5. A holding apparatus as set forth in claim 3, wherein said hook assembly also has a pair of side protrusions across said protrusion which are inserted into a pair of side recessed portions formed across the recess formed in the second end portion of the battery pack for avoiding dislodgment of the battery pack from the battery mount.

6. A holding apparatus as set forth in claim 3, wherein said hook assembly also includes a second protrusion which is inserted into a second recessed portion formed in the second end portion of the battery pack for avoiding dislodgment of the battery pack from the battery mount.

7. A holding apparatus as set forth in claim 6, wherein said hook assembly includes a third protrusion which is urged by the spring pressure into constant engagement with a third recess formed in the second end portion of the battery pack, the third protrusion having a surface inclined at the given angle relative to the direction in which the spring pressure urges said hook assembly into constant engagement of the third protrusion with the third recess so as to split the spring pressure into a horizontal pressure and a vertical pressure, the horizontal play of the battery pack on the battery mount, the vertical pressure urging the second end portion of the battery pack against the battery mount to eliminate the vertical play of the battery pack on the battery mount.

8. A holding apparatus as set forth in claim 7, wherein the third protrusion is provided opposite said protrusion across the second protrusion, the inclined surface of the third protrusion engaging a corner defining the third recess of the battery pack to distribute the spring pressure in a horizontal direction and a vertical direction to produce the horizontal pressure and the vertical pressure.

9. A holding apparatus as set forth in claim 1, wherein said recess includes a projecting portion therein for engaging said protrusion;

said projecting portion including an edge;

said protrusion including an inclined surface inclined at a predetermined angle to a direction of the spring pressure;

said inclined surface engaging said edge of said projecting portion thereby producing horizontal and vertical components of said spring pressure as said horizontal pressure and said vertical pressure.

* * * * *